United States Patent
Hwang et al.

(10) Patent No.: US 8,830,172 B2
(45) Date of Patent: Sep. 9, 2014

(54) SELECTION DEVICE AND METHOD FOR PERFORMING POSITIONING OPERATION

(71) Applicant: IMU Solutions, Inc., Hsinchu (TW)

(72) Inventors: Deng-Huei Hwang, New Taipei (TW); Ruey-Der Lou, Hsinchu (TW); Tsang-Der Ni, Hsinchu (TW)

(73) Assignee: IMU Solutions, Inc., Hsinchu (TW)

( * ) Notice: Subject to any disclaimer, the term of this patent is extended or adjusted under 35 U.S.C. 154(b) by 20 days.

(21) Appl. No.: 13/905,421

(22) Filed: May 30, 2013

(65) Prior Publication Data

US 2013/0257725 A1 Oct. 3, 2013

Related U.S. Application Data

(63) Continuation-in-part of application No. 12/506,696, filed on Jul. 21, 2009, now Pat. No. 8,456,421.

(30) Foreign Application Priority Data

Aug. 11, 2008 (TW) .............................. 97130594 A

(51) Int. Cl.
*G06F 3/033* (2013.01)
*G09G 5/08* (2006.01)

(52) U.S. Cl.
USPC ............................................ 345/158; 345/156

(58) Field of Classification Search
CPC .... G06F 30/304; G06F 3/0308; G06F 3/0346
USPC ........................... 345/156–158, 163, 169, 173
See application file for complete search history.

(56) References Cited

U.S. PATENT DOCUMENTS

| 7,202,491 | B2 * | 4/2007 | Garssen et al. | 250/559.29 |
| 8,527,115 | B2 * | 9/2013 | Greenfeld et al. | 701/3 |
| 8,605,947 | B2 * | 12/2013 | Zhang et al. | 382/104 |
| 2006/0202985 | A1 * | 9/2006 | Kobayashi et al. | 345/419 |

* cited by examiner

*Primary Examiner* — Ricardo L Osorio
(74) *Attorney, Agent, or Firm* — Volpe and Koenig, P.C.

(57) ABSTRACT

A method for performing a positioning operation related to an image area having a specific position includes the following steps. A specific orientation directed towards the specific position is provided, wherein the specific orientation and the specific position have a specific spatial relation therebetween, and the specific orientation and the image area have a specific angle structure therebetween. The specific angle structure is determined by detecting the specific orientation. The specific spatial relation is calculated according to the determined specific angle structure and the image area. A selection device for performing a positioning operation is also provided.

20 Claims, 12 Drawing Sheets

SELECTION DEVICE AND METHOD FOR PERFORMING POSITIONING OPERATION

CROSS-REFERENCE TO RELATED APPLICATION AND CLAIM OF PRIORITY

This application is a continuation-in-part of U.S. patent application Ser. No. 12/506,696, filed Jul. 21, 2009, claiming foreign priority as well to TW-097130594, filed on Aug. 11, 2008, the disclosures of which are incorporated herein in their entirety by reference.

FIELD OF THE INVENTION

The present invention relates to a selection device and method, and more particularly to a selection device and method for performing a positioning operation.

BACKGROUND OF THE INVENTION

For a long time, the common operation way of a conventional two-dimensional (2D) mouse device moved on a table is that the left push button of the mouse device is clicked twice quickly for performing the function of the icon after the cursor on the computer screen is positioned on the icon. Please refer to FIGS. 1(a) and 1(b), which are schematic diagrams showing conventional selection configurations 911 and 912 of an icon selection system 91. As shown in FIG. 1(a), the selection configuration 911 includes an image area 12, an image 13, a cursor 14 and a mouse device 17. The image 13 (not shown) is to be displayed in the image area 12 and includes plural icons 131, 132, 133, 134, 135 and 136. The mouse device 17 may be a 2D one, operated on a plane, or a three-dimensional (3D) one, operated in the air. Regarding the operation of selecting the icon 134, the motion purpose of the conventional mouse device 17 is to move the cursor 14 to the desired icon 134. Therefore, the motion of the mouse device 17 is to move the cursor 14 along X or/and Y directions.

As shown in FIG. 1(b), the cursor 14 in the selection configuration 912 is used for selecting the icon 131, and the motion trace of the cursor 14, generally speaking, can include plural connected line segments such as those A1, A2, A3, A4, A5, A6, A7 and A8.

Recently, as the micro-electro-mechanical types of the accelerometer and the gyroscope are more popular, the so-called 3D mouse device, which senses the motion of the hand in the air thereby for controlling the computer screen pointer to select the icon and to perform the function of the icon, is developed gradually. However, comparing the 3D mouse device with the conventional 2D mouse device used on the table, there are main differences between their operations. The 2D mouse device moving on the table is always supported by the contacting surface of the table, thereby the cursor moved on the screen will not to deviate from the icon pointed when the push button of the 2D mouse is quickly clicked twice with a finger. In contrast, the handheld 3D mouse device operating in the air, does not have an additional support; then the cursor moving on the screen by the 3D mouse is easy to deviate from the location of the selected icon due to a careless on an unintended hand motion when the push button is quickly clicked with a finger for performing the function of the icon, which will make a fault operation. Unfortunately, the user of a commercial product such as Air Mouse of Logitech Inc. is facing the problem.

In order to overcome the above-mentioned problem, some companies arrange an active push button on their products to improve the motion operation of the cursor; e.g. the 3D mouse device/Air Mouse commercial products provided by Gyration Inc. The method is as follows; while the 3D mouse device moves in the air and the active push button is also in a press state, then the cursor on the screen can move with the mouse device; while the cursor is positioned in the icon and the active push button is released, the cursor no longer moves with the mouse device. At this moment, clicking the push button performs the function of the icon even if the mouse device can move. Because relations between the cursor on the screen and the motion of the mouse device are disconnected from each other, the cursor can be positioned in the icon to cause the function to be performed successfully. Although this operation mode can cause the function to be performed correctly, this operation behavior practically violates the ergonomic motion. This operation is not only intermittent without continuity but also uncomfortable.

Please refer to FIG. 1(c), the cursor H11 is controlled to move in the horizontal direction. In a state E111, the remote-control mouse device 11 has an orientation N111, and the orientation N111 with an alignment direction V111 is aligned with the cursor H11. In a state E112, the remote-control device 11 has an orientation N112, and the orientation N112 with an alignment direction V112 is aligned with the cursor H11. The posture or the orientation of the remote-control device 11 in the air points to a variable direction; and ideally, the variable direction is to be aligned with the cursor H11 moved on the screen, so that the user can intuitively consider being consistent with the direction, indicating where the cursor H11 is located, when operating the cursor movement by the gesture or the motion of his/her hand (not shown).

However, a first operation shown in FIG. 1(c) can perplex the operation of the remote-control 3D air mouse device. FIG. 1(d) shows how the perplexity is happing during operation. In a state E121, the remote-control device 11 has an orientation N121 with an alignment direction V121 pointed at the cursor H11. In a state E122, the remote-control device 11 has an orientation N122 with an alignment direction V122 pointed at a position P11 outside the display area 121. For instance, in the state E121, the cursor H11 touches a boundary of the perimeter 1211 of the display area 121. Afterward, if the remote-control device 11 further has a motion or a posture change, the orientation of the remote-control device 11 will only be changed from the orientation N121 into the orientation N122, and the pointing direction of the remote-control device 11 will be correspondingly changed from the alignment direction V121, originally pointing to the cursor H11, into the alignment direction V122, but the remote-control device 11 cannot cause the cursor H11 to further cross over the perimeter 1211, and thus a deviation or a misalignment between the device's orientation and its direction pointing at the cursor H11 is happened.

Under this condition, a second operation shown in FIG. 1(d) will result in the phenomenon shown in FIG. 1(e). In a state E131, the remote-control device 11 has an orientation N131, and the orientation N131 with the alignment direction V131 is aligned with a position P12 outside the display area 121. When the remote-control device 11 is moved back to control the cursor H11 to simultaneously move back away from the boundary, the remote-control device 11 has the orientation N131, which is aligned with the position P12, and the pointing direction of the remote-control device 11 cannot be caused to point to the alignment direction V132 for being aligned with the cursor H11 in the display area 121. In this way, the remote-control device 11 cannot be recovered to have the orientation or the posture, which the remote-control device 11 previously has under the normal operation in the state that the cursor H11 has not touched the perimeter 1211, thereby forming an orientation deviation. The orientation deviation causes that the remote-control device 11 cannot have the alignment direction V132 to be aligned with the cursor H11 in the orientation N131 for intuitively controlling the motion of the cursor H11. Therefore, the inconsistence between the alignment direction of the orientation of the remote-control device 11 and the actual direction pointing to the cursor causes the perplexity when the user operates.

SUMMARY OF THE INVENTION

It is an object of the present invention to mark an area with a circle-shape motion locus or trajectory and cause the locus to encircle or pass through an icon to be selected, or the area enclosed by the locus covers the icon to be selected. After the icon is in a selected status, a motion is subsequently performed to cause a preset function of the icon to be launched, and the motion can be a movements of drawing a check mark "V", a letter "X", a circle"○", or other motion or gesture performed by arm and wrist. This operation method of present invention to select and execute the function of the icon is not only conforming with ergonomics, but also smooth, complete and accomplished at one stretch.

It is therefore an aspect of the present invention to provide a method for performing a positioning operation related to an image area having a specific position. The method includes the following steps. A specific orientation directed towards the specific position is provided, wherein the specific orientation and the specific position have a specific spatial relation therebetween, and the specific orientation and the image area have a specific angle structure therebetween. The specific angle structure is determined by detecting the specific orientation. The specific spatial relation is calculated according to the determined specific angle structure and the image area.

It is therefore another aspect of the present invention to provide a selection device for performing a positioning operation related to an image area having a specific position and a definable position. The selection device includes a selection unit having a motion orientation. The motion orientation and the definable position have a spatial relation therebetween. On a condition that the motion orientation is aligned with a specific orientation directed towards the specific position, the selection unit detects the specific orientation to determine a specific angle structure between the specific orientation and the image area. The selection unit calculates the spatial relation according to the determined specific angle structure and the image area.

It is still another aspect of the present invention to provide a selection device for performing a positioning operation related to an image area having a specific position. The selection device includes a selection unit. On a condition that the selection unit is set to have a specific orientation directed towards the specific position, the selection unit detects the specific orientation to determine a specific angle structure between the specific orientation and the image area, and the specific orientation and the specific position have a specific spatial relation therebetween. The selection unit calculates the specific spatial relation according to the determined specific angle structure and the image area.

It is therefore another aspect of the present invention to provide a control device and method for controlling the cursor moving on a screen to avoid the orientation misalignment between the control device and the cursor by evaluating the measured angles to determine if the cursor should be moved according to the motion of the control device. The control device, being one of a motion-sensing remote controller and an air mouse device, will go back to the original posture or the original orientation to continue to click on an electronic item or control the cursor to move on the screen whether the cursor touches the boundary area of the screen or not.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
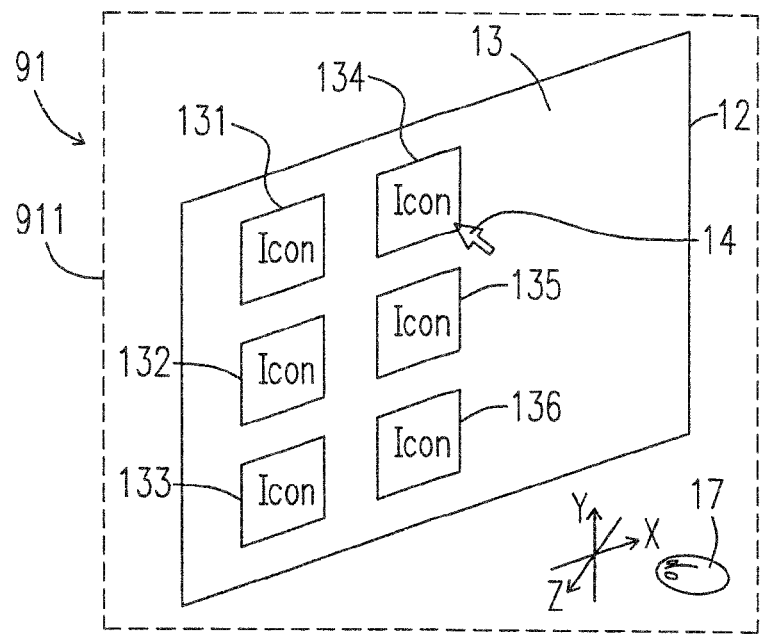
FIG. 1(a), FIG. 1(b), FIG. 1(c), FIG. 1(d) and FIG. 1(e) are schematic diagrams showing selection configurations of a conventional selection system.
Figure 1B:
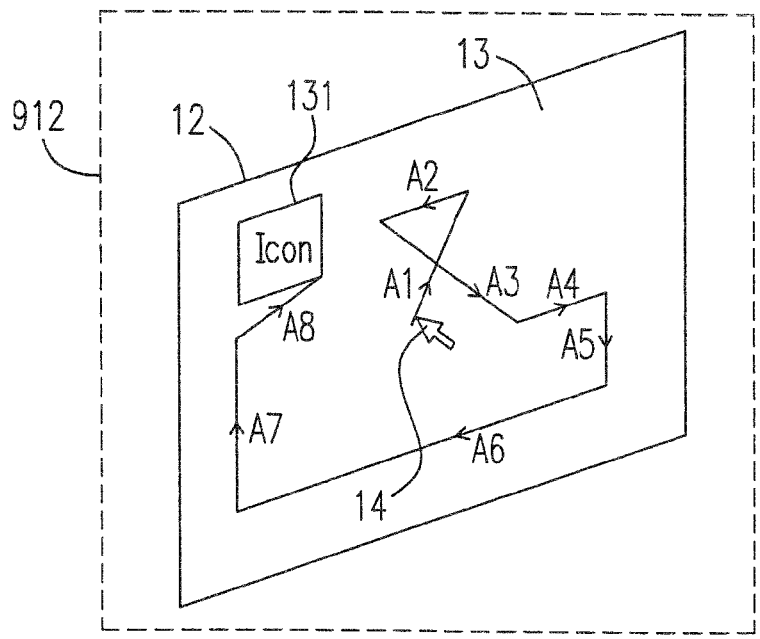
Figure 1C:
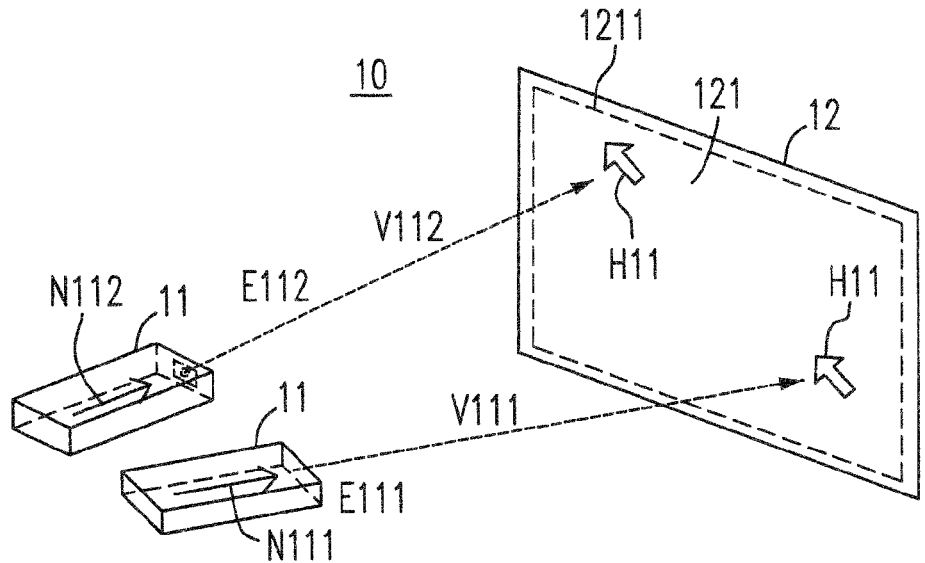
Figure 1D:
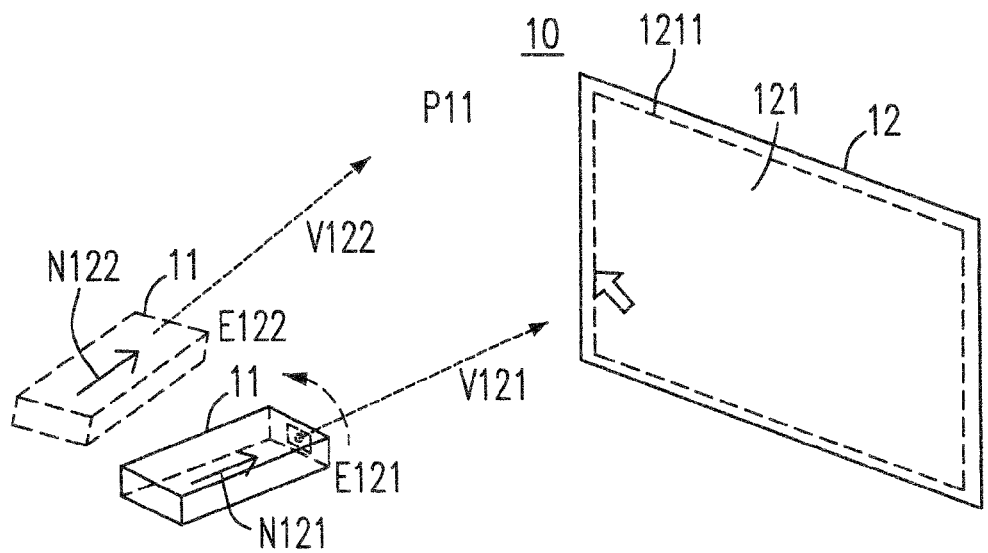
Figure 1E:
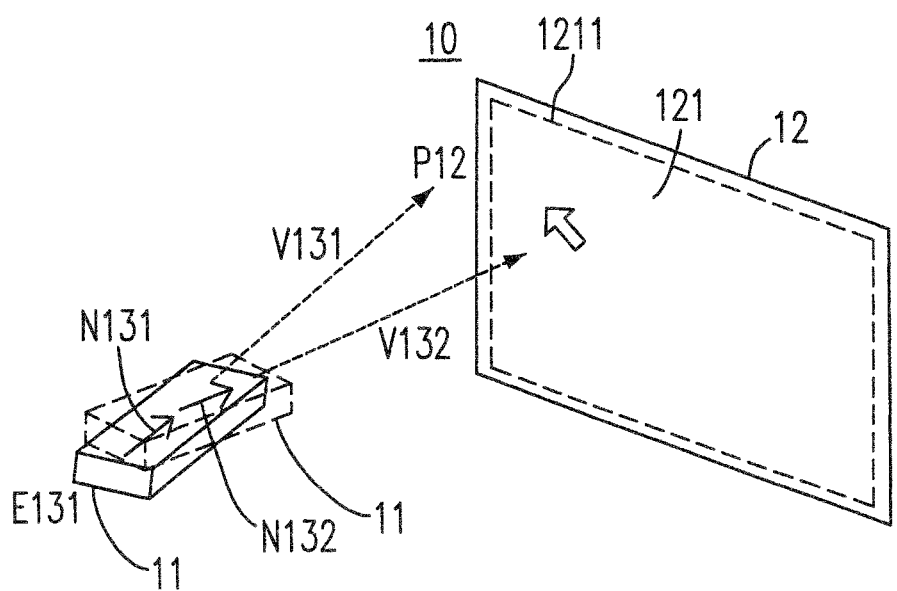
Figure 2:
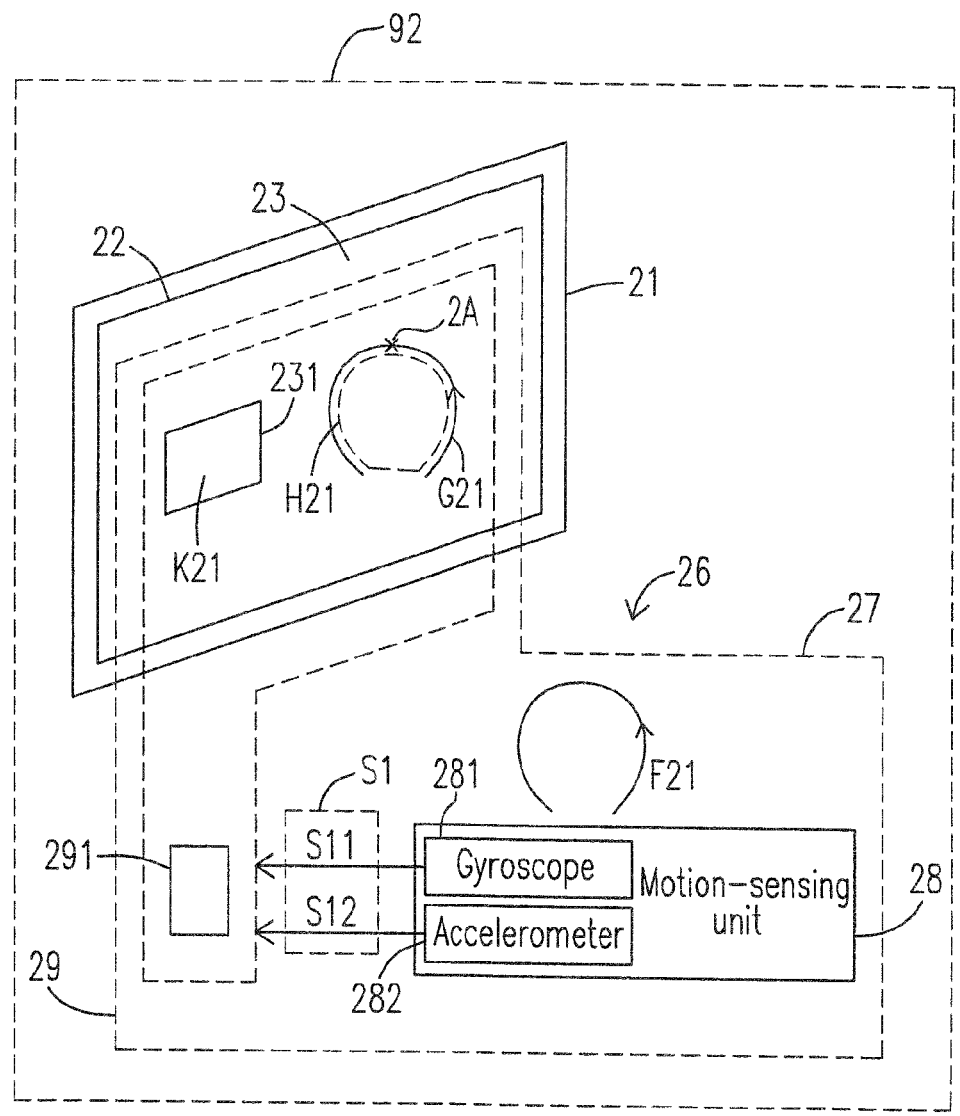
FIG. 2 is a schematic diagram showing a selection system according to the first embodiment of the present invention.

Please refer to FIG. 2, which is a schematic diagram showing a selection system 92 according to the first embodiment of the present invention. As shown, the selection system 92 includes a display screen 21 and a selection device 26. There is an image area 22, where an image 23 is to be displayed, within an area of the display screen 21. There is an icon 231 defined in the image 23, and there is a definable position 2A in the image area 22. The selection device 26 is used for selecting an icon 231 in the image area 22 and includes a selection unit 27.

The selection unit 27 has a motion F21, converts the motion F21 into a locus G21 of the definable position 2A, determines an area H21 in the image area 22 according to the locus G21, and determines whether the icon 231 is to be selected according to the area H21 and an area K21 where the icon 231 is to be displayed in the image area 22.

The selection unit 27 may includes a motion-sensing unit 28 and a processing unit 29. The motion-sensing unit 28 converts the motion F21 into a signal S1. The processing unit 29 converts the signal S1 into the locus G21, determines the area H21 according to the locus G21, and determines whether the icon 231 is to be selected according to the area H21 and the area K21. The processing unit 29 may includes a controller 291 which may include at least one selected from a group consisting of a microcontroller, a microprocessor, a digital signal processor and a central processing unit.

In an embodiment, the motion-sensing unit 28 includes a gyroscope 281, and the gyroscope 281 senses the motion F21 for producing the signal S1. In an embodiment, the motion-sensing unit 28 includes an accelerometer 282, and the accelerometer 282 senses the motion F21 for producing the signal S1. In an embodiment, the motion-sensing unit 28 includes the gyroscope 281 and the accelerometer 282. The gyroscope 281 has at least two sensing degrees of freedom and senses the motion F21 for producing a first portion S11 of the signal S1. The accelerometer has at least two sensing degrees of freedom and senses the motion F21 for producing a second portion S12 of the signal S1.

A hand (not shown) may drive the selection unit 27 to form the motion F21 of the selection unit 27. The motion F21 may include at least one of a three-dimensional motion and a two-dimensional motion. The locus G21 of the definable position 2A may include at least one selected from a group consisting of a first arc having an arc angle, a combination of a second arc and a first line segment, and plural second line segments. The arc angle of the first arc is in a degree being one selected from a group consisting of 360°, near 360°, and beyond 360° when the locus G21 is the first arc.

The area H21 determined by the locus G21 includes a closed area, and the icon has the area K21. The selection unit 27 causes the icon 231 to be selected when in a specific condition, wherein the specific condition is one selected from a group consisting of: a first condition that the areas H21 and K21 are partially overlapping, a second condition that the areas H21 and K21 are entirely overlapping, a third condition that the area H21 is entirely covering the area K21, a fourth condition that a centroid of the area H21 is within the area K21, a fifth condition that the locus G21 passes through the area K21, and a sixth condition that the locus G21 touches the area K21.

In an embodiment, the selection device 26 includes a motion-sensing unit 28 and a processing unit 29. The motion-sensing unit 28 senses the motion F21 and converts the motion F21 into the signal S1. The processing unit 29 converts the signal S1 into the locus G21 of the definable position 2A in the image area 22, determines the area H21 in the image area 22 according to the locus G21, and determines whether the icon 231 is to be selected according to the area H21 and an area K21 where the icon 231 is to be displayed in the image area 22. The motion F21 sensed by the motion-sensing unit 28 may be generated by at least one selected from a group (not shown) consisting of a hand, an arm, a foot, a leg, a head, a neck, a shoulder and a waist.

Figure 3:
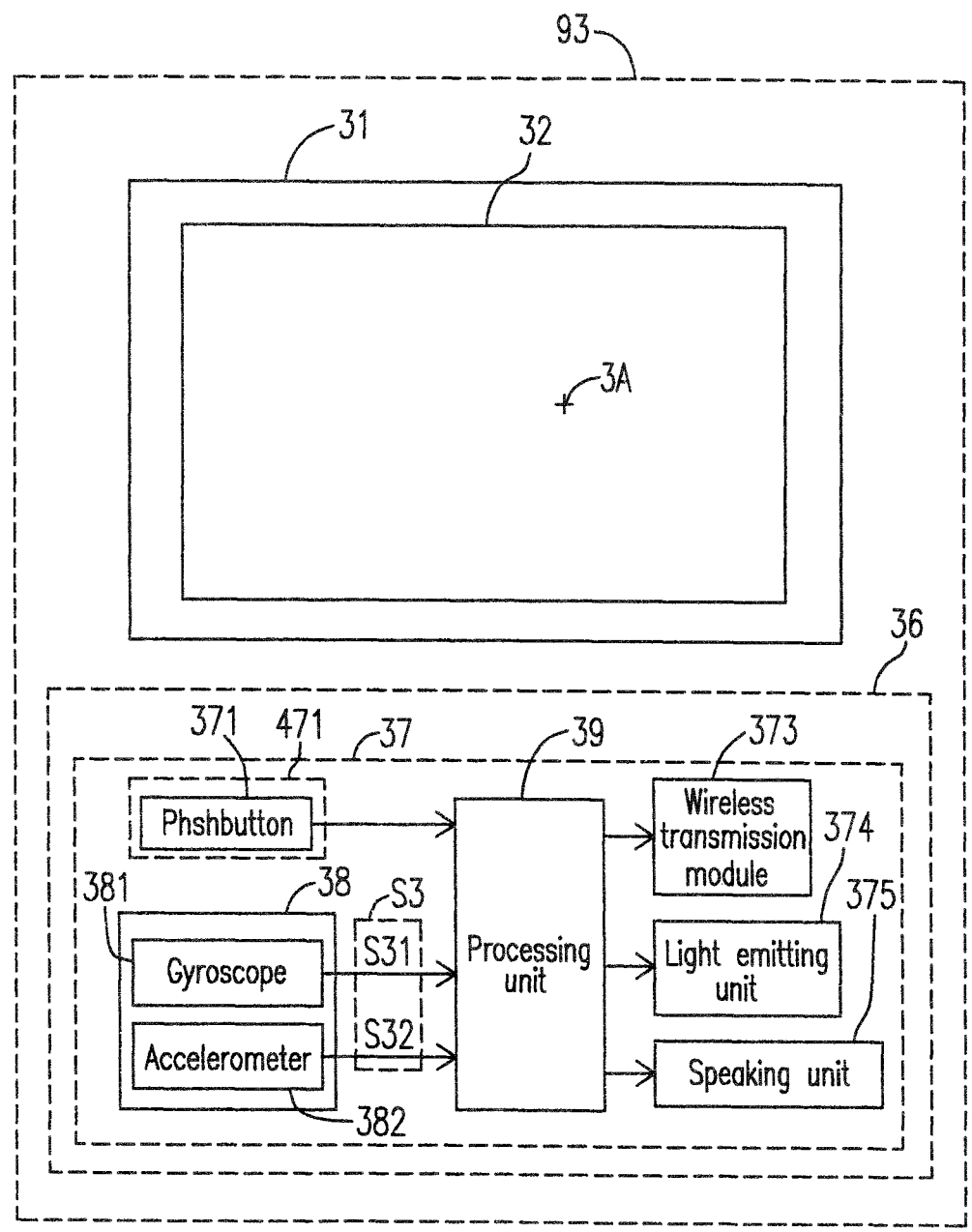
FIG. 3 is a schematic diagram showing a selection system according to the second embodiment of the present invention.

Please refer to FIG. 3, which is a schematic diagram showing a selection system 93 according to the second embodiment of the present invention. As shown, the selection system 93 includes a display screen 31 and a selection device 36. There is an image area 32 within an area of the display screen 31, and there is a definable position 3A in the image area 32, wherein the definable position 3A may be defined to any position in the image area 32.

The selection device 36 includes a selection unit 37. The selection unit 37 includes a defining device 471, a motion-sensing unit 38, a processing unit 39, a wireless transmission module 373, a light emitting unit 374 and a speaking unit 375. Each of the defining device 471, the motion-sensing unit 38, the wireless transmission module 373, the light emitting unit 374 and the speaking unit 375 is coupled to the processing unit 39. For instance, the defining device 471 includes a push-button device 371.

The motion-sensing unit 38 has the ability to sense a three-dimensional (x, y, z) motion and provides a signal S3 to the processing unit 39. The motion-sensing unit 38 at least includes a gyroscope 381 and/or an accelerometer 382, wherein either the gyroscope 381 or the accelerometer 382 may have one, two or three independent sensing degree(s) of freedom. The gyroscope 381 and the accelerometer 382 provide a sub-signal S31 and a sub-signal S32 of the signal S3 respectively to the processing unit 39.

Figure 4A:
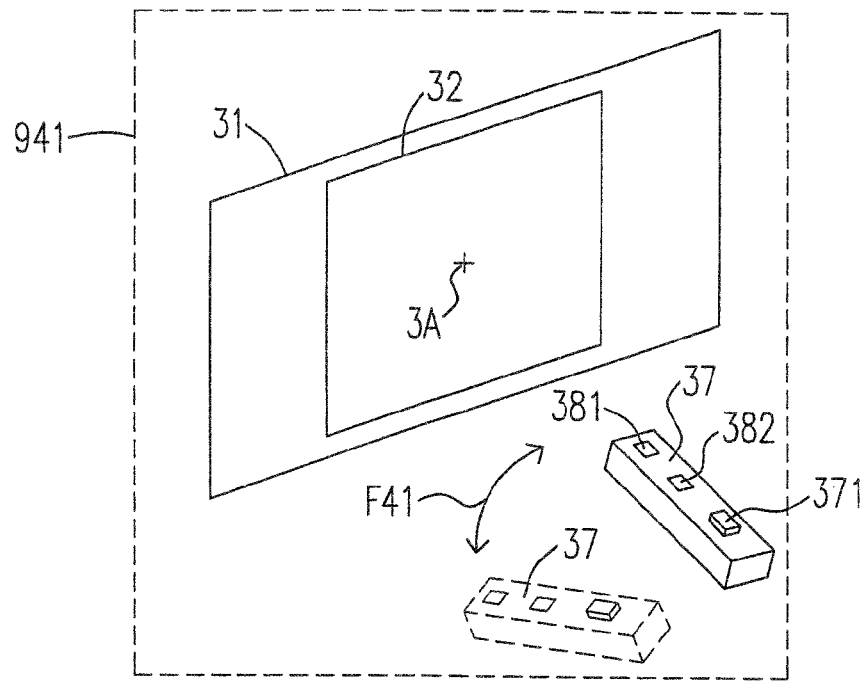
FIG. 4(a) and FIG. 4(b) are schematic diagrams showing initialization configurations of the selection system according to the second embodiment of the present invention.
Figure 4B:
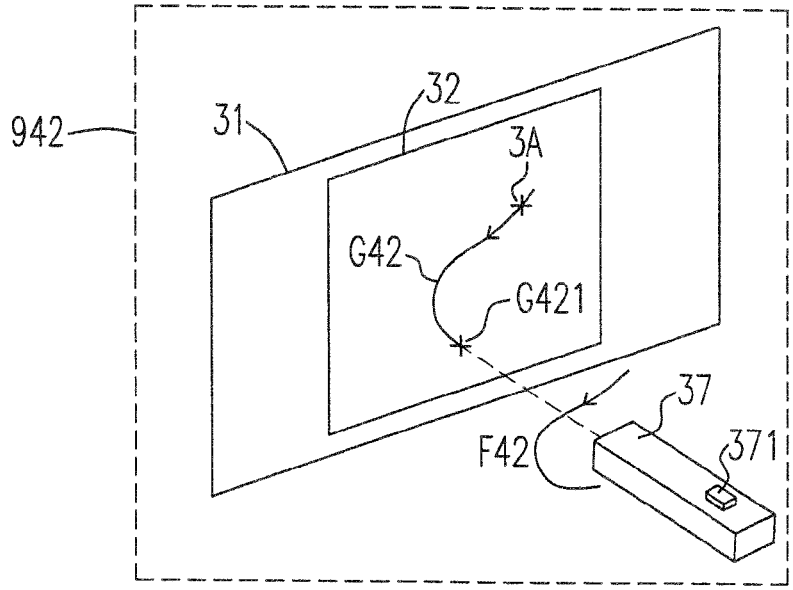

Please refer to FIG. 4(a) and FIG. 4(b), which are schematic diagrams showing initialization configurations 941 and 942 of the selection system 93 according to the second embodiment of the present invention. As shown in FIG. 4(a), in order to initialize or start the motion sensing, the push button 371 of the selection unit 37 can be pushed to start sensing, or a certain motion is used to start sensing. In other words, the certain motion may be sensed by the accelerometer 382 and recognized by means of interpreting the acceleration/deceleration in order to start the sensing function. For instance, an up-down pitching motion F41 is used to start the motion-sensing function of the selection unit 37.

As shown in FIG. 4(b), after the motion-sensing function of the selection unit 37 starts, a locus G42 of the definable position 3A in the image area 32 corresponds to a locus of the motion F42 of the selection unit 37, and a reference point G421 of the locus G42 may be set up. The absolute coordinate of the terminating point of the locus G42 swept by the selection unit 37 is read through pushing the push button 371, and the terminating point is taken to be the reference point G421 for starting positioning.

Figure 5:
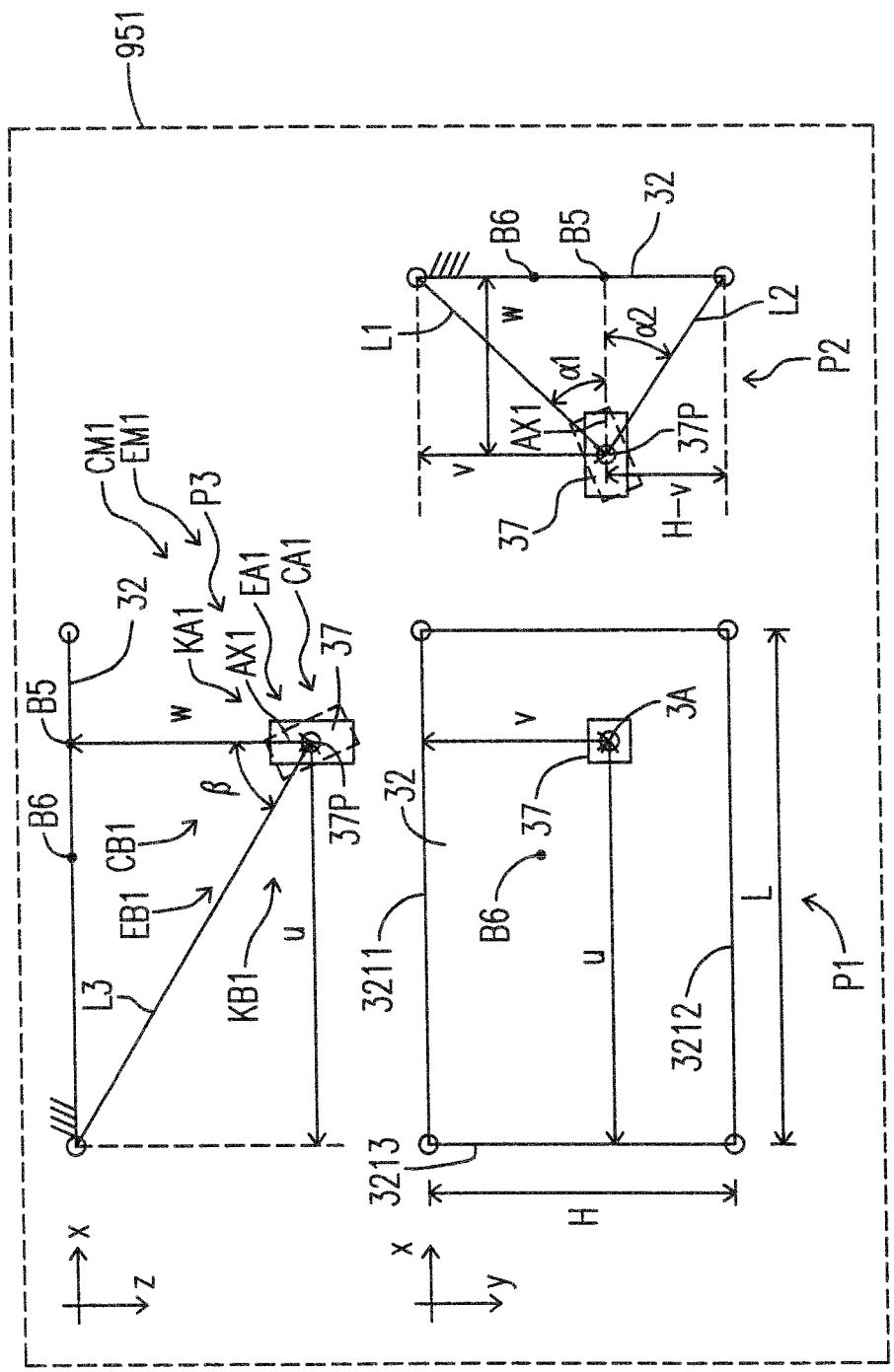
FIG. 5 is a schematic diagram showing a correspondence configuration of the selection system according to the second embodiment of the present invention.

Please refer to FIG. 5, which is schematic diagram showing a correspondence configuration 951 of the selection system 93 according to the second embodiment of the present invention. As shown, the correspondence configuration 951 includes a front view configuration P1, a right view configuration P2 and a top view configuration P3. The initial position value of the reference point G421 is determined and the definable position 3A is correlated with a motion orientation CM1 of the selection unit 37 through deriving the correspondence relation between the range of the image area 32 and the operation range of the selection unit 37.

In FIG. 5, the symbols H and L denote the dimensions, the length and the width (e.g., in pixel basis), of the image area 32 respectively. The symbols u, v and w denote the respective distances between the selection unit 37 and three consisting of the left 3213 and the upper 3211 edges of the image area 32 and the display screen 31 (perpendicular) thereof The symbols α1, α2 and β denote the respective included angles between the selection unit 37 and three consisting of the upper 3211, the lower 3212 and the left 3213 edges of the image area 32, wherein the angles α1 and α2 may be measured by the accelerometer 382 of the selection unit 37, and the angle β may be measured by the gyroscope 381. The correspondence relation between the motion orientation CM1 of the selection unit 37 and the definable position 3A in the image area 32 may be obtained through the calculation of the geometric relation in FIG. 5 as follows: $u=H \tan \beta/(\tan \beta1+\tan \alpha2)$; $v=H \tan \alpha1/(\tan \alpha1+\tan \alpha2)$; $w=H/(\tan \alpha1+\tan \alpha2)$.

The selection unit 37 has the motion orientation CM1, a reference position 37P and a specific axis AX1, and the image area 32 has a specific position B5. For instance, when selection unit 37 points at the specific position B5, the motion orientation CM1 is directed towards the specific position B5 and is aligned with a specific orientation CA1. The motion orientation CM1 and the definable position 3A have a spatial relation EM1 therebetween. The specific orientation CA1 and the specific position B5 have a specific spatial relation EA1 therebetween. The specific orientation CA1 and the image area 32 have a specific angle structure KA1 therebetween. The reference position 37P and the upper edge 3211 have a line segment L1 therebetween extending from the reference position 37P to the upper edge 3211. The reference position 37P and the lower edge 3212 have a line segment L2 therebetween extending from the reference position 37P to the lower edge 3212. The reference position 37P and the left edge 3213 have a line segment L3 therebetween extending from the reference position 37P to the left edge 3213. For instance, the upper edge 3211, the lower edge 3212 and the left edge 3213 form three boundary lines, respectively; and the line segments L1, L2 and L3 are perpendicular to the upper edge 3211, the lower edge 3212 and the left edge 3213, respectively.

The motion orientation CM1 can be changed to align with an orientation CB1 different from the specific orientation CA1. The orientation CB1 and the image area 32 have an angle structure KB1 therebetween. The selection unit 37 can define the definable position 3A as a specific position B6 under the orientation CB1, wherein specific position B6 is different from the specific position B5.

The variation of the set (u, v, w) forms the relative displacement set (Δx, Δy, Δz). The absolute coordinate (x, y, z) of the definable position 3A may be obtain with the relative displacement set (Δx, Δy, Δz). The above-mentioned position technique may include features of: the initialization of the motion-sensing; the initialization of the position of the reference point; the correspondence between the operation range, where the selection unit 37 moves to mark, and the range of the image area 32; the compensation of the reference point, and so on. An operation program resident in a computer (not shown), coupled to the selection unit 37, may perform the technique. In an embodiment, the processing unit 39 built in the selection unit 37 may perform the technique.

Figure 6A:
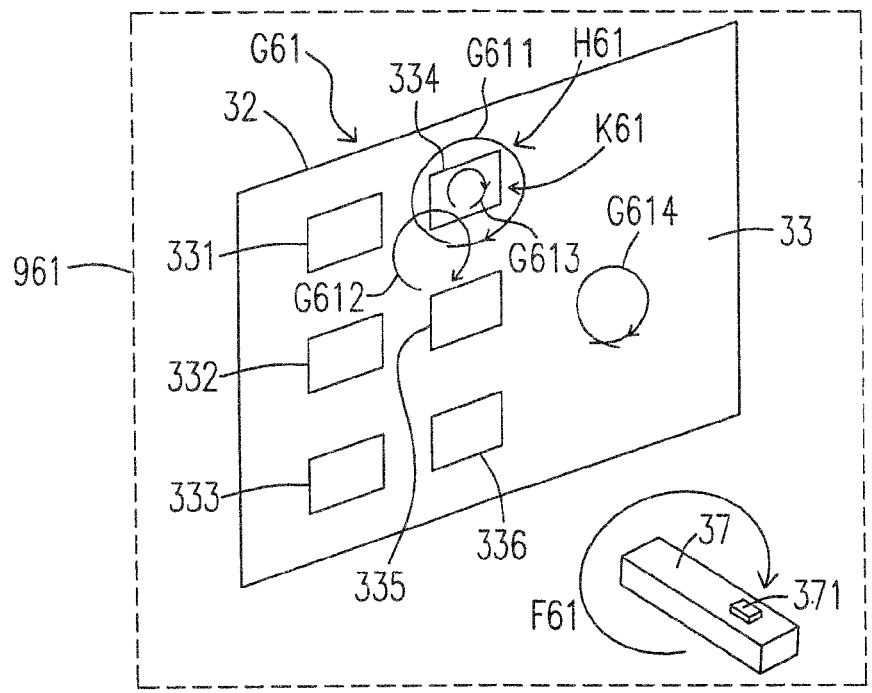
FIG. 6(a) and FIG. 6(b) are schematic diagrams showing selection configurations of the selection system according to the second embodiment of the present invention.
Figure 6B:
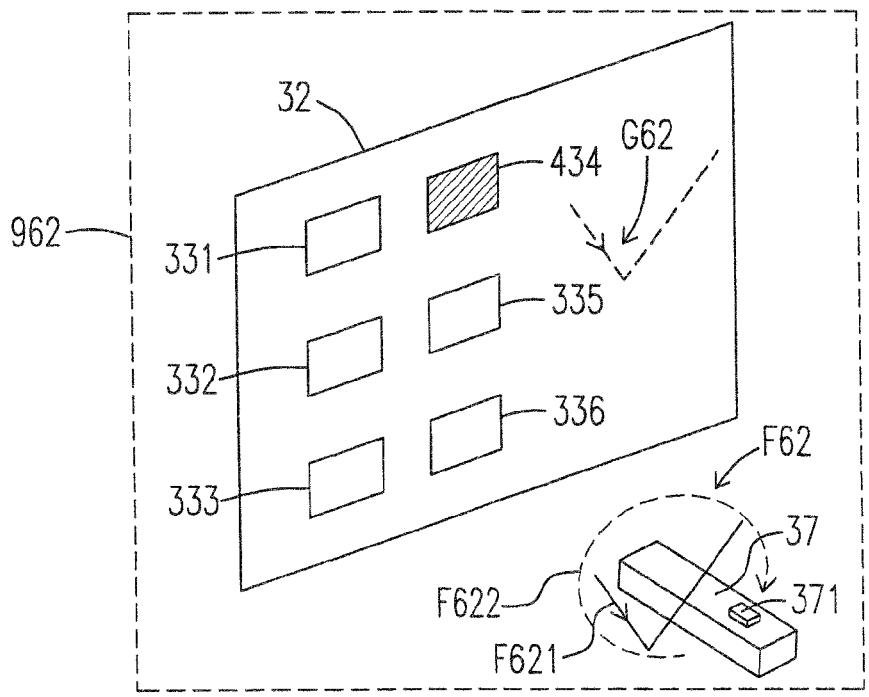

Please refer to FIG. 6(a) and FIG. 6(b), which are schematic diagrams showing selection configurations 961 and 962 of the selection system 93 according to the second embodiment of the present invention. As shown in FIG. 6(a), an image 33 is displayed and filled in the image area 32, and plural icons 331, 332, 333, 334, 335 and 336 are defined in the image 33. A locus G61 (may be one of loci G611, G612, G613 and G614) of the definable position 3A corresponds to a motion F61. The following conditions are judged by means of a certain operation method. Whether the drawn locus G61 certainly encircles or passes through the coordinate of the icon 334 in the image area 32 or not? Whether the marked area H61 is partially overlapped with, entirely overlapped with or entirely covers the defined area K61 or not? The area H61 marked by the locus G61 and a centroid of the area H61 are calculated, and whether the centroid is located in the area K61 of the marked icon 334. If one of the above-mentioned conditions is true, the icon 334 is to be selected.

Under the present condition, as shown in FIG. 6(b), the color of the marked icon 334 can be changed (e.g. with the highlight or the blinking) and the marked icon 334 is replaced with an icon 434. Alternatively, the computer (not shown), coupled to the selection unit 37, or the selection unit 37 produces sound, emits light, or produces force feedback or vibration to remind the operator, who makes the motion F61, that the icon 334 is in the selected status.

After the marking motion completes, as shown in FIG. 6(b), the operator further makes a motion F62 to produce a message, which causes a preset function of the icon 334 to be performed. The motion F62 may includes at least one movement of drawing a check mark F621, a letter "X", a wavy line, a triangle, an arc or a circle. Alternatively, the motion F62 is that the wrist turns the selection unit 37 to produce a pitching motion, a yawing motion, or a rolling motion, or draw an arc or a circle F622 again. The selection unit 37 may convert the motion F62 into a locus G62 of the definable position 3A, and the locus G62 may be not shown. A preset acceleration-deceleration, a motion or a rotation modes is utilized to judge the acceleration-deceleration, the motion or the rotation modes of the locus G62 or the motion F62 for determining whether a preset function of the icon 334 or 434 is to be performed, wherein the locus G62 has the shape of the motion F62.

For instance, the accelerometer 382 may be used to sense the acceleration-deceleration distribution of the motion F62 or an inclination for the selection unit 37 with the motion F62; therefore, the accelerometer 382 can output the sub-signal S32 of the signal S3 to the processing unit 39 as shown in FIG. 3. The processing unit 39 analyzes an acceleration-deceleration distribution of the motion F62 according to the sub-signal S32 and an execution signal is formed to cause the preset function of the icon 434 to be performed. The execution signal may be similar to a conventional execution signal sent on condition that the left push button of the conventional mouse device is clicked twice quickly when the cursor is positioned in the desired icon, which cause a preset function of the desired icon to be performed.

Figure 7A:
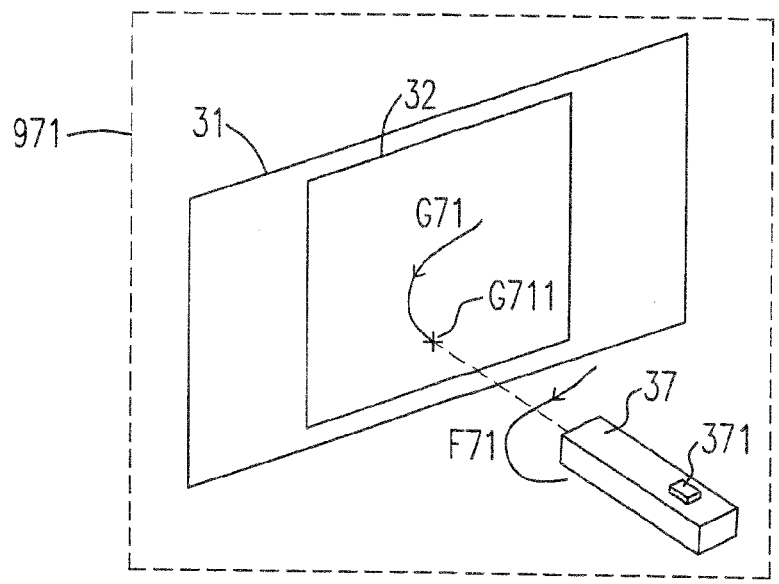
FIG. 7(a) and FIG. 7(b) are schematic diagrams showing position configurations of the selection system according to the second embodiment of the present invention.
Figure 7B:
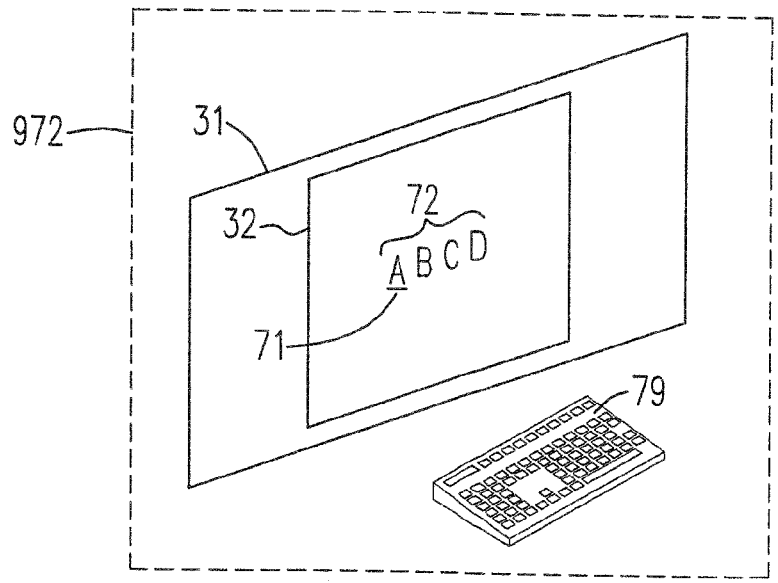

Please refer to FIG. 7(a) and FIG. 7(b), which are schematic diagrams showing position configurations 971 and 972 of the selection system 93 according to the second embodiment of the present invention. As shown in FIG. 7(a), the definable position 3A may be positioned to a certain position G711 in the image area 32 by the push button 371 of the selection unit 37. For instance, the definable position 3A moves to form a locus G71 in response to a motion F71 of the selection unit 37; when the definable position 3A sweeps to the certain position G711, the push button 371 is clicked once. In this way, the above-mentioned operation program can obtain the absolute coordinate (x, y, z) of the certain position G711, which is the terminating point swept by the selection unit 37 at present. As shown in FIG. 7(a), the definable position 3A is positioned to the certain position G711, and a keyboard 79 inputs data 72, as shown in FIG. 7(b), which have an input starting point 71 corresponding to the certain position G711.

In an embodiment in reference to the illustrations from FIG. 3 to FIG. 7(b), a selection device 36 for performing a positioning operation related to an image area 32 is provided, wherein the image area 32 has a specific position B5 and a definable position 3A. The selection device 36 includes a selection unit 37 having a motion orientation CM1. The motion orientation CM1 and the definable position 3A have a spatial relation EM1 therebetween. On a condition that the motion orientation CM1 is aligned with a specific orientation CA1 directed towards the specific position B5, the selection unit 37 detects the specific orientation CA1 to determine a specific angle structure KA1 between the specific orientation CA1 and the image area 32. The selection unit 37 calculates the spatial relation EM1 according to the determined specific angle structure and the image area 32.

For instance, the spatial relation EM1 is calculated in order to perform the positioning operation. For instance, the selection unit 37 is a remote-control unit, and has a reference position 37P and a specific axis AX1 passing through the reference position 37P. For instance, the specific axis AX1 serves as a pointing axis. The selection unit 37 causes the definable position 3A to be defined as the specific position B5 under the specific orientation CA1, and determines an angle structure KB1 between an orientation CB1 and the image area 32 on a condition the motion orientation CM1 is aligned with the orientation CB1 different from the specific orientation CA1. The selection unit 37 includes a defining device 471, a motion-sensing unit 38 and a processing unit 39. The defining device 471 forms a defining signal in response to a first defining operation applied to the defining device 471. The motion-sensing unit 38 produces a signal S3 for determining the motion orientation CM1, wherein the signal S3 has a sub-signal S31 and a sub-signal S32. For instance, the positioning operation is performed to define the definable position 3A as a position in the image area 32.

For instance, the specific orientation CA1 is represented by using the specific angle structure KA1, and the orientation CB1 is represented by using the angle structure KB1. On a condition that the motion orientation CM1 is aligned with the orientation CB1, the processing unit 39 calculates the orientation CB1 according to the signal S3 so as to generate a determined angle structure for the angle structure KB1. The processing unit 39 calculates a specific position B6 in the image area 32 according to the determined angle structure for the angle structure KB1, the determined specific angle structure for the specific angle structure KA1, and the image area 32, wherein the specific position B6 is different from the specific position B5. The processing unit 39 defines the definable position 3A as the specific position B6 under the orientation CB1, thereby causing a trajectory (such as the trajectory G42) of the definable position 3A to be formed in the image area 32 for the motion orientation CM1. When the defining signal is formed, the processing unit 39 causes the definable position 3A to be defined as a reference position G421 having a first absolute coordinate according to the defining signal, the signal S3 and the calculated spatial relation for the spatial relation EM1 and causes the first absolute coordinate to be read. For instance, the reference position G421 is a reference point.

For instance, the defining device 471 is one of a push-button device 371 and a motion-sensing trigger device (not shown). The motion-sensing unit 38 includes a gyroscope 381 and an accelerometer 382. The gyroscope 381 is coupled to the processing unit 39, and produces the sub-signal S31. The accelerometer 382 is coupled to the processing unit 39, and produces the sub-signal S32.

For instance, the selection unit 37 detects the specific orientation CA1 to produce the determined specific angle structure for the specific angle structure KA1, and points to the specific position B5 in the specific orientation CA1. The image area 32 is located on a display screen 31, and has a length H, a width L, an upper edge 3211, a lower edge 3212 and a left edge 3213. The specific position B5 and the left edge 3213 have a perpendicular distance u therebetween. The specific position B5 and the upper edge have a perpendicular distance v therebetween. The reference position 37P and the display screen 31 have a perpendicular distance w therebetween, wherein the perpendicular distance w is given between the reference position 37P and the specific position B5, and the perpendicular distances u, v and w constitute a perpendicular distance group {u, v, w}. The reference position 37P and the upper edge 3211 have a line segment L1 therebetween extending from the reference position 37P to the upper edge 3211. The reference position 37P and the lower edge 3212 have a line segment L2 therebetween extending from the reference position 37P to the lower edge 3212. The reference position 37P and the left edge 3213 have a line segment L3 therebetween extending from the reference position 37P to the left edge 3213. The specific axis AX1 and the line segment L1 have an included angle $\alpha 1$ therebetween. The specific axis AX1 and the line segment L2 have an included angle $\alpha 2$ therebetween. The specific axis AX1 and the line segment L3 have an included angle $\beta$ therebetween. The spatial relation EM1 is equal to a specific spatial relation EA1 under the specific orientation CA1, wherein the specific spatial relation EA1 satisfies equations of $u = H \tan \beta / (\tan \alpha 1 + \tan \alpha 2)$, $v = H \tan \alpha 1 / (\tan \alpha 1 + \tan \alpha 2)$ and $w = H / (\tan \alpha 1 + \tan \alpha 2)$.

For instance, the selection unit 37 or the processing unit 39 measures the included angle $\alpha 1$ and the included angle $\alpha 2$ by using the sub-signal S32, and measures the included angle $\beta$ by using the sub-signal S31. The specific angle structure KA1 includes the included angles $\alpha 1$, $\alpha 2$ and $\beta$. The included angles $\alpha 1$, $\alpha 2$ and $\beta$ are measured to respectively form a first measured angle, a second measured angle and a third measured angle. The determined specific angle structure for the specific angle structure KA1 includes the first, the second and the third measured angles. The definable position 3A is defined to have a second absolute coordinate associated with a displacement. The perpendicular distance group {u, v, w} has a variation corresponding to the displacement. The processing unit 39 causes the second absolute coordinate to be obtained by using the displacement.

For instance, the motion orientation CM1 includes the reference position 37P and the specific axis AX1. The motion orientation CM1 can be aligned with a first orientation, a second orientation, a third orientation and the specific orientation CA1 respectively at a first time, a second time, a third time and a fourth time, wherein the first, the second, the third and the fourth times are different, and each of the first, the second and the third times is earlier than the fourth time. For instance, the first, the second and the third orientations are aligned with the line segments L1, L2 and L3, respectively; and the specific orientation CA1 is aligned with a line segment extending from the reference position 37P to the specific position B5. When the motion orientation CM1 is aligned with the first orientation, the selection unit 37 detects the first orientation to generate a detected first orientation. When the motion orientation CM1 is aligned with the second orientation, the selection unit 37 detects the second orientation to generate a detected second orientation. When the motion orientation CM1 is aligned with the third orientation, the selection unit 37 detects the third orientation to generate a detected third orientation. When the motion orientation CM1 is aligned with the specific orientation CA1, the selection unit 37 detects the specific orientation CA1 to generate a detected specific orientation, measures the included angle $\alpha 1$ according to the detected specific orientation and the detected first orientation, measures the included angle $\alpha 2$ according to the detected specific orientation and the detected second orientation, and measures the included angle $\beta$ according to the detected specific orientation and the detected third orientation, thereby determining the specific angle structure KA1. In a similar manner, when the motion orientation CM1 is aligned with the orientation CB1, the selection unit 37 determines the angle structure KB1.

For instance, the selection unit 37 further has a motion F71, and converts the motion F71 into a trajectory G71 of the definable position 3A. When the definable position 3A reaches a specific position G711 having a third absolute coordinate on the image area 32, the defining device 471 causes the definable position 3A to be defined as the specific position G711 through the processing unit 39 in response to a second defining operation and causes the third absolute coordinate to be obtained, wherein the second defining operation is applied to the defining device 471. For instance, the selection unit 37 is coupled to a computer (not shown) calculating the spatial relation EM1 for performing the positioning operation.

In an embodiment in reference to the illustrations from FIG. 3 to FIG. 7(b), a method for performing a positioning operation related to an image area 32 is provided, wherein the image area 32 has a specific position B5. The method includes the following steps. A specific orientation CA1 directed towards the specific position B5 is provided, wherein the specific orientation CA1 and the specific position B5 have a specific spatial relation EA1 therebetween, and the specific orientation CA1 and the image area 32 have a specific angle structure KA1 therebetween. The specific angle structure KA1 is determined by detecting the specific orientation CA1. The specific spatial relation EA1 is calculated according to the determined specific angle structure and the image area 32.

For instance, the method further includes a step of providing a selection unit 37. The selection unit 37 has a motion orientation CM1, a reference position 37P and a specific axis AX1. On a condition that the motion orientation CM1 is aligned with the specific orientation CA1, the specific orientation CA1 is detected. The specific spatial relation KA1 is calculated in order to perform the positioning operation. The image area 32 further has a definable position 3A, and the motion orientation CM1 and the definable position 3A have a spatial relation EM1 therebetween.

For instance, the method further includes the following steps. The definable position 3A is defined as the specific position B5 under the specific orientation CA1, wherein the specific orientation CA1 is represented by using the specific angle structure KA1. On a condition that the motion orientation CM1 is aligned with an orientation CB1 different from the specific orientation CA1, an angle structure KB1 is determined between the orientation CB1 and the image area 32 by detecting the orientation CB1, wherein the orientation CB1 is represented by using the angle structure KB1. A specific position B6 is calculated in the image area 32 according to the determined angle structure for the angle structure KB1, the determined specific angle structure for the specific angle structure KA1, and the image area 32, wherein the specific position B6 is different from the specific position B5. The definable position 3A is defined as the specific position B6 under the orientation CB1. The definable position 3A is defined as a reference position G421 having a first absolute coordinate in response to a first defining operation in order to read the first absolute coordinate. A gyroscope 381 and an accelerometer 382 are provided; and a defining device 471 for sensing the first defining operation is provided. A signal S3 is produced for determining the motion orientation CM1, wherein the signal S3 has a sub-signal S31 produced by the gyroscope 381 and a sub-signal S32 produced by the accelerometer 382. A trajectory G42 of the definable position 3A in the image area 32 is formed according to the signal S3 and the calculated specific spatial relation for the specific spatial relation EA1.

For instance, the defining device 471 is one of a push-button device 371 and a motion-sensing trigger device (not shown), and the reference position G421 is a reference point. The first defining operation includes a position defining push applied to the push-button device 371 when the defining device is the push-button device. The first defining operation includes a position defining motion applied to the motion-sensing trigger device when the defining device 471 is the motion-sensing trigger device.

For instance, the spatial relation EM1 is equal to the specific spatial relation EA1 under the specific orientation CA1, wherein the specific spatial relation EA1 satisfies equations of u=H tan β/(tan α1+tan α2), v=H tan α1/(tan α1+tan α2) and w=H/(tan α1+tan α2). The definable position 3A is defined to have a second absolute coordinate associated with a displacement. The perpendicular distance group {u, v, w} has a variation corresponding to the displacement.

For instance, the method further includes the following steps. The included angles α1 and α2 are measured by using the sub-signal S32. The included angle β is measured by using the sub-signal S31, wherein the specific angle structure KA1 including the included angles α1, α2 and β; the included angles α1, α2 and β are measured to respectively form a first measured angle, a second measured angle and a third measured angle; and the determined specific angle structure for the specific angle structure KA1 includes the first, the second and the third measured angles.

For instance, the method further includes the following steps. The second absolute coordinate is obtained by using the displacement. The selection unit 37 is caused to have a motion F71. The motion F71 is converted into a trajectory G71 of the definable position 3A. When the definable position 3A reaches a specific position G711 having a third absolute coordinate on the image area 32, the definable position 3A is defined as the specific position G711 in response to a second defining operation and the third absolute coordinate is obtained. A computer (not shown) coupled to the selection unit 37 is provided. The spatial relation EM1 is calculated by the computer for performing the positioning operation.

In an embodiment in reference to the illustrations from FIG. 3 to FIG. 7(b), a selection device 36 for performing a positioning operation related to an image area 32 is provided, wherein the image area 32 has a specific position B5. The selection device 36 includes a selection unit 37. On a condition that the selection unit 37 is set to have a specific orientation CA1 directed towards the specific position B5, the selection unit 37 detects the specific orientation CA1 to determine a specific angle structure KA1 between the specific orientation CA1 and the image area 32, and the specific orientation CA1 and the specific position B5 have a specific spatial relation EA1 therebetween. The selection unit 37 calculates the specific spatial relation EA1 according to the determined specific angle structure and the image area 32.

For instance, the image area 32 further has a definable position 3A. The selection unit 37 further has a motion orientation CM1. On a condition that the motion orientation CM1 is aligned with a orientation CB1 different from the specific orientation CA1, the selection unit 37 detects the orientation CB1 to determine an angle structure KB1 between the orientation CB1 and the image area 32. The selection unit 37 calculates a specific position B6 in the image area 32 according to the determined angle structure for the angle structure KB1, the determined specific angle structure for the specific angle structure KA1, and the image area 32, wherein the specific position B6 is different from the specific position B5. The selection unit 37 defines the definable position 3A as the specific position B6 under the orientation CB1, thereby causing a trajectory (such as the trajectory G42) of the definable position 3A to be formed in the image area 32 for the motion orientation CM1.

Please refer to FIGS. 8(a), 8(b), 8(c) and 8(d), which are schematic diagrams showing scroll configurations 981, 982, 983 and 984 of the selection system 93 according to the second embodiment of the present invention. As shown, there is an image 83 displayed in the image area 32. The selection unit 37 is configured to have a motion (e.g. one of F811, F821, F831 and F841) to establish a starting point (e.g. one of R11, R21, R31 and R41) of the definable position 3A in the image area 32 and causes the image 83 to be scrolled in the image area 32 by the motion (e.g. one of F811, F821, F831 and F841). The motion may be an upward F811, a downward F821, a leftward F831 or a rightward F841 instantaneous motion. The gyroscope 381 or the accelerometer 382 is utilized to sense the above-mentioned motion in order to perform the scroll function.

Figure 8A:
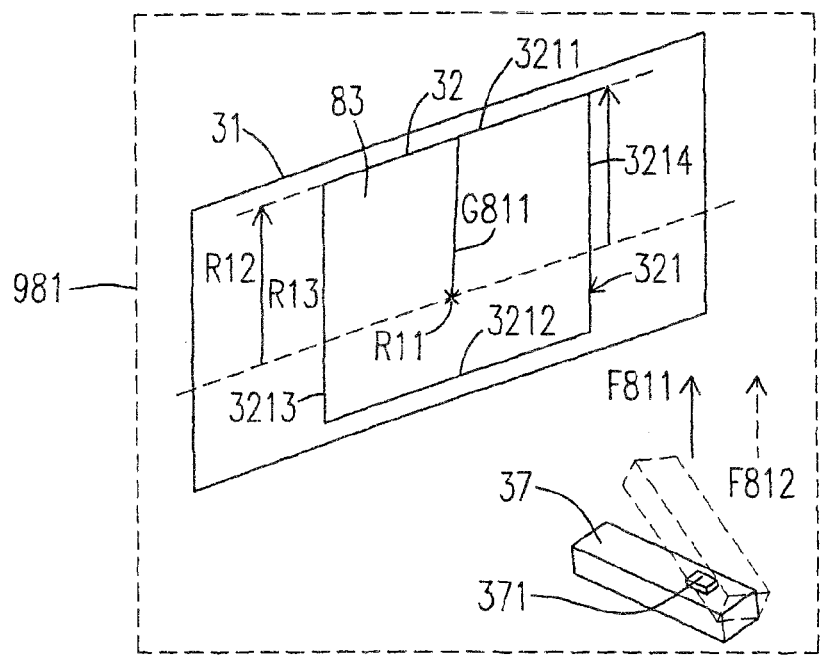
FIG. 8(a), FIG. 8(b), FIG. 8(c) and FIG. 8(d) are schematic diagrams showing scroll configurations of the selection system according to the second embodiment of the present invention.
Figure 8B:
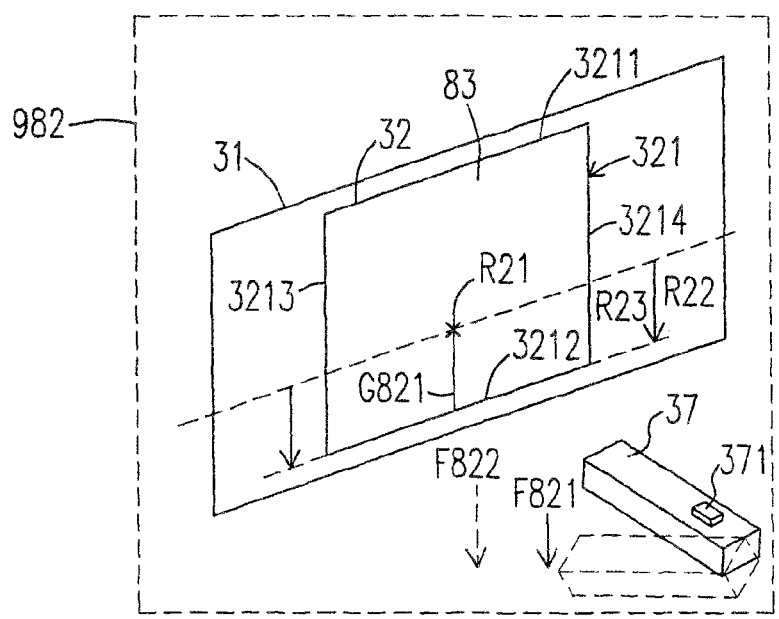

As shown in FIG. 8(a) and FIG. 8(b), an up-down scroll operation is performed in the image area 32. The selection unit 37 causes an upward or a downward scroll operation to be performed by an upward F811 or a downward F821 instantaneous motion. As to the scrolling amount, a distance R13 between the position of the starting point R11 and the upper edge 3211 of the image area 32 represents a scrolling amount, which the image 83 scrolls upward. Besides, a distance R23 between the position of the starting point R21 and the lower edge 3212 of the image area 32 represents a scrolling amount, which the image 83 scrolls downward.

Figure 8C:
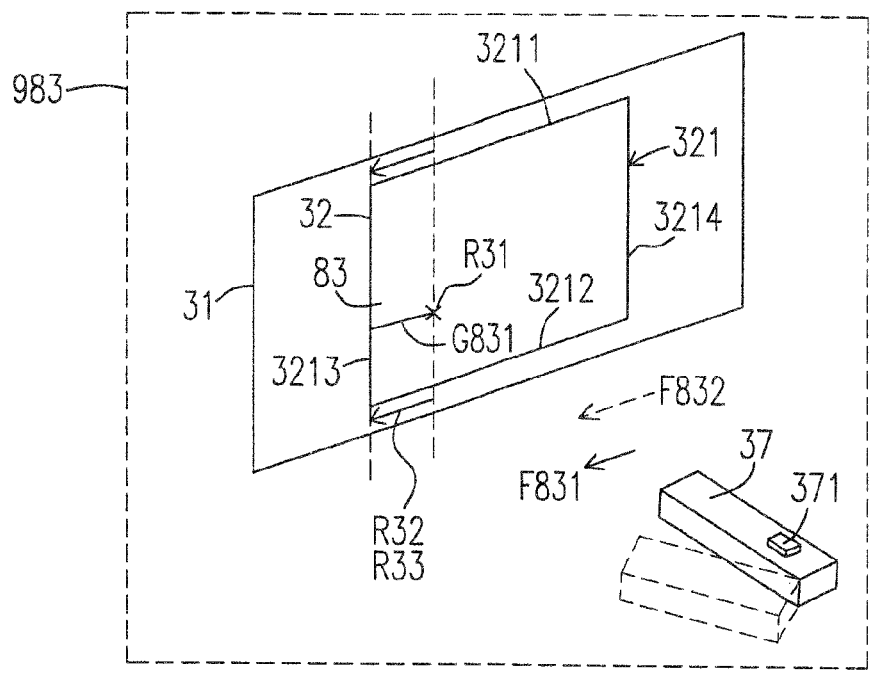
Figure 8D:
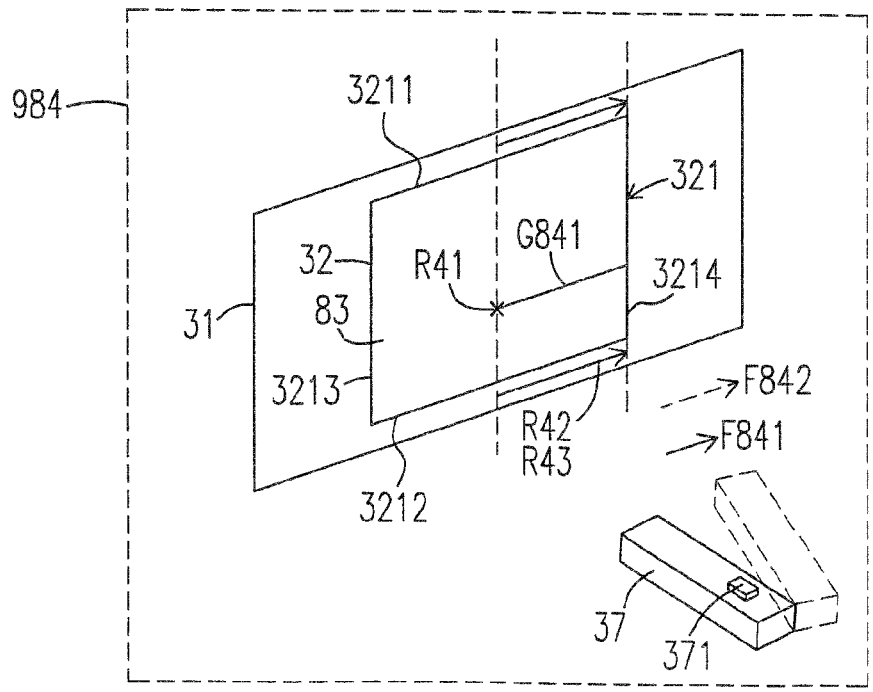

As shown in FIG. 8(c) and FIG. 8(d), a left-right scroll operation is performed in the image area 32. The selection unit 37 causes a leftward or a rightward scroll operation to be performed by a leftward F831 or a rightward F841 instantaneous motion. As to the scroll amount, a distance R33 between the position of the starting point R31 and the left edge 3213 of the image area 32 represents a scroll amount, which the image 83 scrolls leftward. Besides, a distance R43 between the position of the starting point R41 and the right edge 3214 of the image area 32 represents a scroll amount, which the image 83 scrolls rightward.

In an embodiment, the selection unit 37 is configured to have a motion (e.g. one of F811, F821, F831 and F841), converts the motion into a locus (e.g. one of G811, G821, G831 and G841 corresponding to F811, F821, F831 and F841 respectively) of the definable position 3A in the image area 32, wherein the locus is a line segment near one of a horizontal and a vertical line segments having a direction (e.g. one of R12, R22, R32 and R42) and a starting point (e.g. one of R11, R21, R31 and R41) within the image area 32. The selection unit 37 causes the image 83 displayed in the image area 32 to be scrolled by another motion (e.g. one of F812, F822, F832 and F842 corresponding to F811, F821, F831 and F841 respectively) according to the starting point and the direction of the line segment and a boundary 321 of the image area 32.

Figure 9:
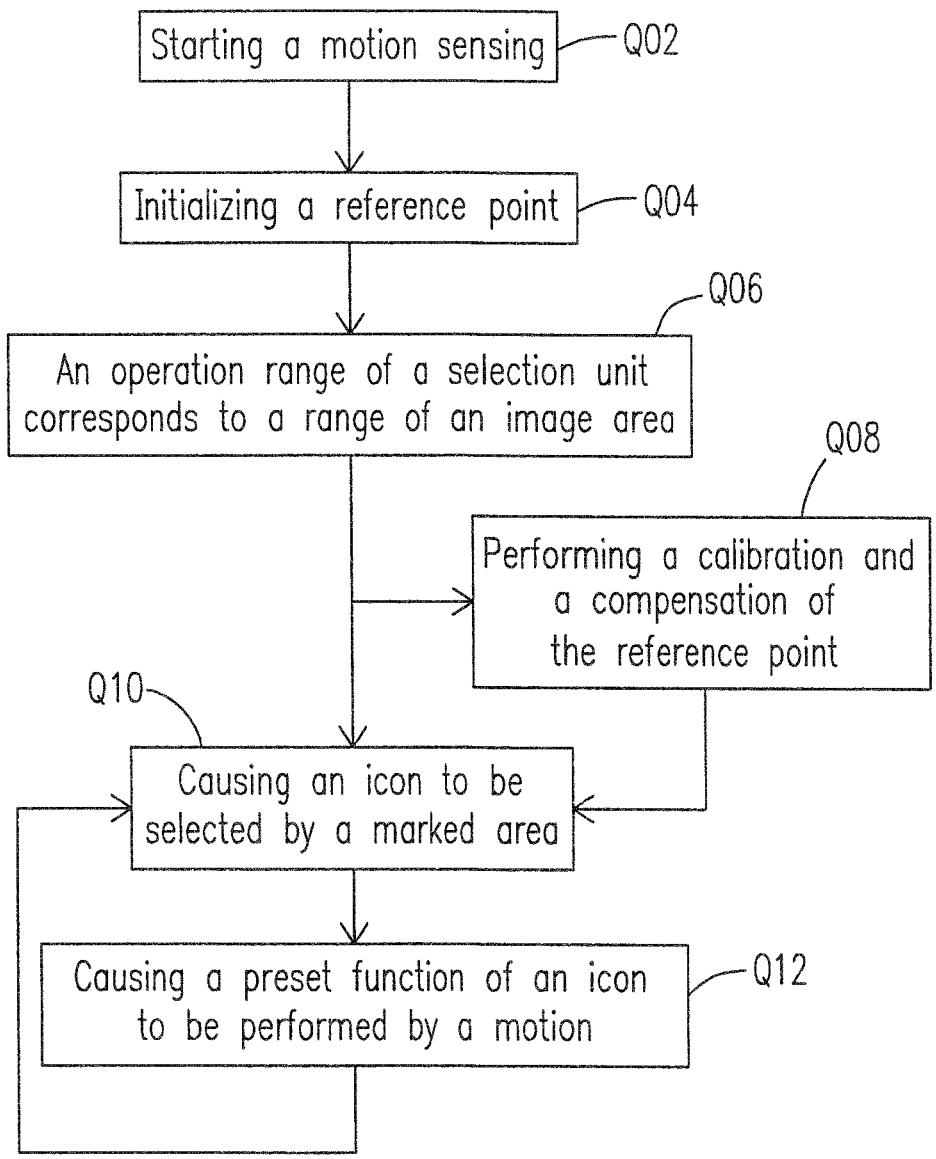
FIG. 9 is a flow diagram showing an operation of the selection system according to the second embodiment of the present invention.

Please refer to FIG. 9, which is a flow diagram showing an operation of the selection system 93 according to the second embodiment of the present invention. As shown in Step Q02, a motion sensing starts. In Q04, a reference point G421 for positioning is initialized; e.g., the reference point G421 of the locus G42 of the definable position 3A is initialized. In Q06, the operation range of the selection unit 37 corresponds to the range of the image area 32 for correlating the definable position 3A with a motion orientation CM1 of the selection unit 37. In Q08, a calibration and a compensation of the reference point G421 is performed. In step Q10, a marked area H61 is utilized to cause the icon 334 to be selected. In step Q12, the motion F62 is utilized to cause a preset function of the icon 334 to be performed.

Please refer to FIG. 2 again. A selection method for selecting an icon 231 in an image area 22 is described according to the present invention. The method includes the following steps. A motion F21 is converted into a locus G21 in the image area 22. An area H21 in the image area 22 is determined according to the locus G21. And, the selection of the icon 231 is determined by the relations between the area H21 and an area K21 where the icon 231 is to be displayed in the image area 22.

Compared to the operation of the existing 3D air mouse device, the progresses of the present invention include that the operation of marking an area collocates with the natural motion of the wrist and the arm, and is utilized to cause the icon on the screen to be selected and cause the preset function of the icon to be performed, which is different from the existing technique on the market. In the existing technique, e.g. Gyration 3D remote controller or Logitech Air Mouse, a cursor or an object on the screen is moved to select the icon on the screen first, and then the active push button of the conventional mouse device is clicked twice quickly to cause the preset function of the icon to be performed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for performing a positioning operation related to an image area having a first specific position, the method comprising steps of:
   providing a specific orientation directed towards the first specific position, wherein the specific orientation and the first specific position have a specific spatial relation therebetween, and the specific orientation and the image area have a specific angle structure therebetween; and
   determining the specific angle structure by detecting the specific orientation;
   calculating the specific spatial relation according to the determined specific angle structure and the image area.

2. A method according to claim 1, further comprising a step of providing a selection unit, wherein:
   the selection unit has a motion orientation, a first reference position and a specific axis;
   on a condition that the motion orientation is aligned with the specific orientation, the specific orientation is detected;
   the specific spatial relation is calculated in order to perform the positioning operation; and
   the image area further has a definable position, and the motion orientation and the definable position have a first spatial relation therebetween.

3. A method according to claim 2, further comprising steps of:
   defining the definable position as the first specific position under the specific orientation, wherein the specific orientation is represented by using the specific angle structure;
   on a condition that the motion orientation is aligned with a first orientation different from the specific orientation, determining a first angle structure between the first orientation and the image area by detecting the first orientation, wherein the first orientation is represented by using the first angle structure;
   calculating a second specific position in the image area according to the determined first angle structure, the determined specific angle structure and the image area, wherein the second specific position is different from the first specific position;
   defining the definable position as the second specific position under the first orientation;
   defining the definable position as a second reference position having a first absolute coordinate in response to a first defining operation in order to read the first absolute coordinate;

providing a gyroscope, an accelerometer and a defining device for sensing the first defining operation;

producing a signal for determining the motion orientation, wherein the signal has a first sub-signal produced by the gyroscope and a second sub-signal produced by the accelerometer; and forming a first trajectory of the definable position in the image area according to the signal and the calculated specific spatial relation.

4. A method according to claim 3, wherein the defining device is one of a push-button device and a motion-sensing trigger device, and the second reference position is a reference point.

5. A method according to claim 4, wherein:

the first defining operation includes a position defining push applied to the push-button device when the defining device is the push-button device; and the first defining operation includes a position defining motion applied to the motion-sensing trigger device when the defining device is the motion-sensing trigger device.

6. A method according to claim 2, wherein:

the image area is located on a display screen, and has a length H, a width L, an upper edge, a lower edge and a left edge;

the first specific position and the left edge have a first perpendicular distance u therebetween;

the first specific position and the upper edge have a second perpendicular distance v therebetween;

the first reference position and the display screen have a third perpendicular distance w therebetween, wherein the third perpendicular distance w is given between the first reference position and the first specific position, and the first, the second and the third perpendicular distances constitute a perpendicular distance group {u, v, w};

the first reference position and the upper edge have a first line segment therebetween extending from the first reference position to the upper edge;

the first reference position and the lower edge have a second line segment therebetween extending from the first reference position to the lower edge;

the first reference position and the left edge have a third line segment therebetween extending from the first reference position to the left edge;

the specific axis and the first line segment have a first included angle $\alpha 1$ therebetween;

the specific axis and the second line segment have a second included angle $\alpha 2$ therebetween;

the specific axis and the third line segment have a third included angle $\beta$ therebetween;

the first spatial relation is equal to the specific spatial relation under the specific orientation, wherein the specific spatial relation satisfies equations of $u=H \tan \beta/(\tan \alpha 1+\tan \alpha 2)$, $v=H \tan \alpha 1/(\tan \alpha 1+\tan \alpha 2)$ and $w=H/(\tan \alpha 1+\tan \alpha 2)$;

the definable position is defined to have a second absolute coordinate associated with a displacement; and the perpendicular distance group {u, v, w} has a variation corresponding to the displacement.

7. A method according to claim 6, further comprising steps of:

measuring the first included angle $\alpha 1$ and the second included angle $\alpha 2$ by using the second sub-signal; and measuring the third included angle $\beta$ by using the first sub-signal, wherein:

the specific angle structure including the first, the second and the third included angles $\alpha 1$, $\alpha 2$ and $\beta$;

the first, the second and the third included angles $\alpha 1$, $\alpha 2$ and $\beta$ are measured to respectively form a first measured angle, a second measured angle and a third measured angle; and the determined specific angle structure includes the first, the second and the third measured angles.

8. A method according to claim 6, further comprising steps of:

obtaining the second absolute coordinate by using the displacement;

causing the selection unit to have a motion;

converting the motion into a second trajectory of the definable position; and when the definable position reaches a second specific position having a third absolute coordinate on the image area, defining the definable position as the second specific position in response to a second defining operation and obtaining the third absolute coordinate.

9. A method according to claim 2, further comprising steps of:

providing a computer coupled to the selection unit; and calculating the first spatial relation by the computer for performing the positioning operation.

10. A selection device for performing a positioning operation related to an image area having a first specific position and a definable position, the selection device comprising:

a selection unit having a motion orientation, wherein:

the motion orientation and the definable position have a spatial relation therebetween;

on a condition that the motion orientation is aligned with a specific orientation directed towards the first specific position, the selection unit detects the specific orientation to determine a specific angle structure between the specific orientation and the image area; and the selection unit calculates the spatial relation according to the determined specific angle structure and the image area.

11. A selection device according to claim 10, wherein the selection unit has a first reference position and a specific axis, causes the definable position to be defined as the first specific position under the specific orientation, determines a first angle structure between a first orientation and the image area on a condition the motion orientation is aligned with the first orientation different from the specific orientation, and comprises:

a defining device forming a defining signal in response to a first defining operation;

a motion-sensing unit producing a first signal for determining the motion orientation, wherein the first signal has a first sub-signal and a second sub-signal; and a processing unit receiving the defining signal and the first signal, and generating the determined specific angle structure according to the first signal, wherein:

the specific orientation is represented by using the specific angle structure, and the first orientation is represented by using the first angle structure;

on a condition that the motion orientation is aligned with the first orientation, the processing unit calculates the first orientation according to the first signal so as to generate the determined first angle structure;

the processing unit calculates a second specific position in the image area according to the determined first angle structure, the determined specific angle structure and the image area, wherein the second specific position is different from the first specific position;

the processing unit defines the definable position as the second specific position under the first orientation, thereby causing a first trajectory of the definable position to be formed in the image area for the motion orientation; and when the defining signal is formed, the processing unit causes the definable position to be defined as a second reference position having a first absolute coordinate according to the defining signal, the first signal and the calculated spatial relation and causes the first absolute coordinate to be read.

12. A selection device according to claim 11, wherein the defining device is one of a push-button device and a motion-sensing trigger device, and the second reference position is a reference point.

13. A selection device according to claim 11, wherein the motion-sensing unit further comprises:
- a gyroscope coupled to the processing unit, and producing the first sub-signal; and
- an accelerometer coupled to the processing unit, and producing the second sub-signal.

14. A selection device according to claim 11, wherein:
the image area is located on a display screen, and has a length H, a width L, an upper edge, a lower edge and a left edge;
the first specific position and the left edge have a first perpendicular distance u therebetween;
the first specific position and the upper edge have a second perpendicular distance v therebetween;
the first reference position and the display screen have a third perpendicular distance w therebetween, wherein the third perpendicular distance w is given between the first reference position and the first specific position, and the first, the second and the third perpendicular distances constitute a perpendicular distance group $\{u, v, w\}$;
the first reference position and the upper edge have a first line segment therebetween extending from the first reference position perpendicularly to the upper edge;
the first reference position and the lower edge have a second line segment therebetween extending from the first reference position perpendicularly to the lower edge;
the first reference position and the left edge have a third line segment therebetween extending from the first reference position perpendicularly to the left edge;
the specific axis and the first line segment have a first included angle $\alpha 1$ therebetween;
the specific axis and the second line segment have a second included angle $\alpha 2$ therebetween;
the specific axis and the third line segment have a third included angle $\beta$ therebetween; and
the spatial relation is equal to a specific spatial relation under the specific orientation, wherein the specific spatial relation satisfies equations of $u=H \tan \beta/(\tan \alpha 1+\tan \alpha 2)$, $v=H \tan \alpha 1/(\tan \alpha 1+\tan \alpha 2)$ and $w=H/(\tan \alpha 1+\tan \alpha 2)$.

15. A selection device according to claim 14, wherein:
the selection unit measures the first included angle $\alpha 1$ and the second included angle $\alpha 2$ by using the second sub-signal, and measures the third included angle $\beta$ by using the first sub-signal;
the specific angle structure includes the first, the second and the third included angles $\alpha 1$, $\alpha 2$ and $\beta$;
the first, the second and the third included angles $\alpha 1$, $\alpha 2$ and $\beta$ are measured to respectively form a first measured angle, a second measured angle and a third measured angle; and
the determined specific angle structure includes the first, the second and the third measured angles.

16. A selection device according to claim 14, wherein:
the definable position is defined to have a second absolute coordinate associated with a displacement;
the perpendicular distance group $\{u, v, w\}$ has a variation corresponding to the displacement; and
the processing unit causes the second absolute coordinate to be obtained by using the displacement.

17. A selection device according to claim 11, wherein:
the selection unit further has a motion, and converts the motion into a second trajectory of the definable position; and when the definable position reaches a second specific position having a second absolute coordinate on the image area, the defining device causes the definable position to be defined as the second specific position through the processing unit in response to a second defining operation and causes the second absolute coordinate to be obtained.

18. A selection device according to claim 10, wherein the selection unit is coupled to a computer calculating the spatial relation for performing the positioning operation.

19. A selection device for performing a positioning operation related to an image area having a first specific position, the selection device comprising:
a selection unit, wherein:
on a condition that the selection unit is set to have a specific orientation directed towards the first specific position, the selection unit detects the specific orientation to determine a specific angle structure between the specific orientation and the image area, and the specific orientation and the first specific position have a specific spatial relation therebetween; and
the selection unit calculates the specific spatial relation according to the determined specific angle structure and the image area.

20. A selection device according to claim 19, wherein:
the image area further has a definable position;
the selection unit further has a motion orientation;
on a condition that the motion orientation is aligned with a first orientation different from the specific orientation, the selection unit detects the first orientation to determine a first angle structure between the first orientation and the image area;
the selection unit calculates a second specific position in the image area according to the determined first angle structure, the determined specific angle structure and the image area, wherein the second specific position is different from the first specific position; and
the selection unit defines the definable position as the second specific position under the first orientation, thereby causing a trajectory of the definable position to be formed in the image area for the motion orientation.

* * * * *